United States Patent Office 2,710,646
Patented June 14, 1955

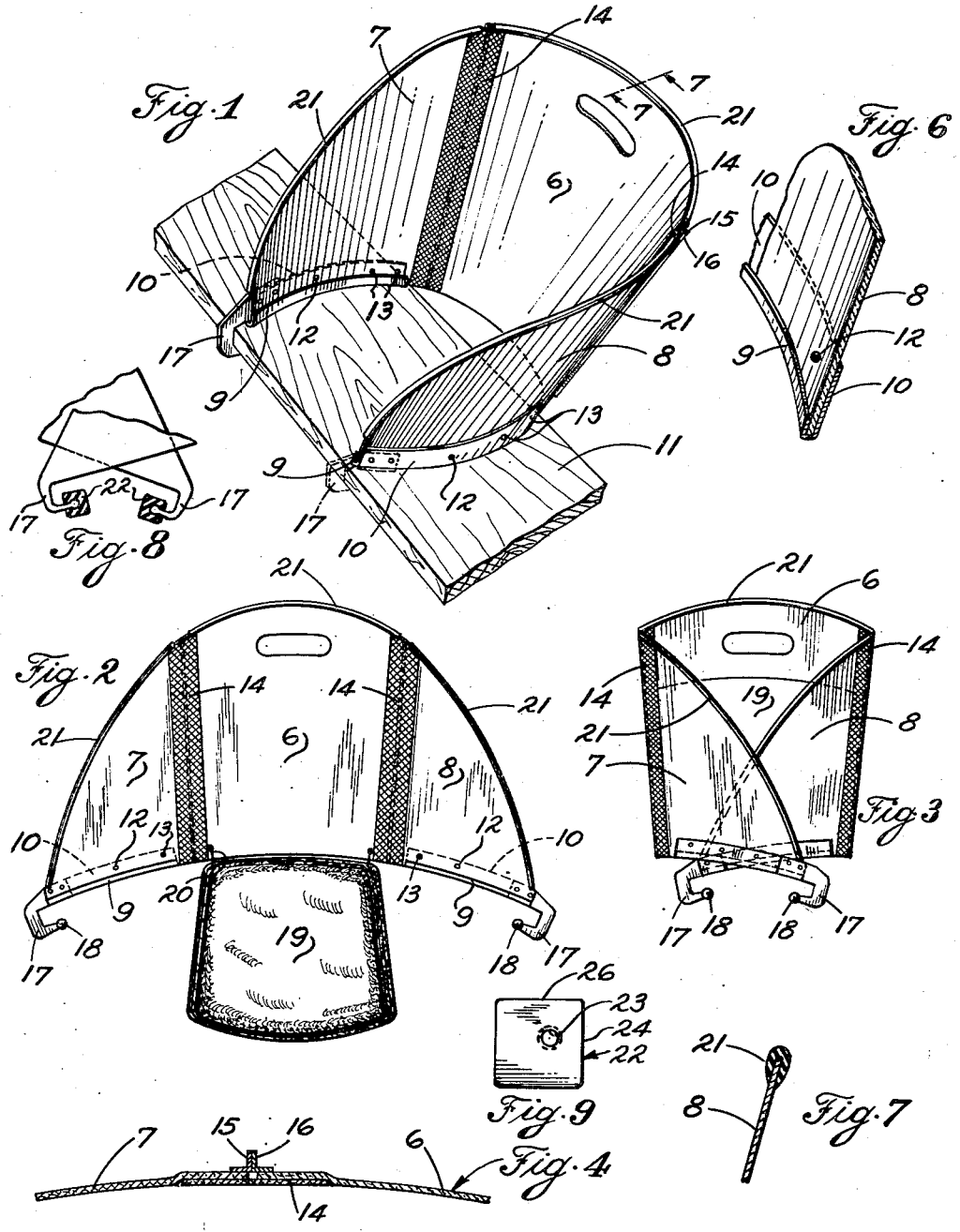

2,710,646

PORTABLE SEAT-BACK

James B. Kirby, West Richfield, Ohio

Application October 19, 1953, Serial No. 386,720

11 Claims. (Cl. 155—133)

This invention which is a continuation in part of my co-pending application, Serial No. 4,159, filed January 24, 1948, now abandoned, relates to seat-backs and more particularly to a portable seat-back which may be easily attached to a boat seat or stadium seat.

It is among the objects of the present invention to provide a flexible seat-back which may be conveniently transported and which is made of fiber glass so as to be resistant to weathering.

It is a further object of my invention to provide a foldable seat-back wherein the channels comprising the seat-back are arranged so as to form a conical surface of revolution.

It is a further object of my invention to provide a foldable seat-back wherein a pair of sides are hinged to the back of the seat and said sides are maintained in a curved position by a metal channel which embraces the lower edges of the sides.

It is still a further object of my invention to provide a foldable seat-back adapted to be easily mounted on a boat seat, stadium seat, or the like, which provides adjustable mounting means adapted to engage the seat to which it is secured.

Further objects and advantages relating to economy of manufacture and rigidity in construction and long life will appear from the following description and the appended drawings, wherein:

Fig. 1 is a perspective view of the seat-back of my invention;

Fig. 2 is a developed plan view of the seat-back of my invention;

Fig. 3 is an elevation showing the seat-back folded for transport;

Fig. 4 is a sectional view showing the hinge arrangement between the sides and the back of the seat;

Fig. 5 is a sectional view of a modified form of hinge arrangement for the seat-back of my invention;

Fig. 6 is an enlarged sectional view with parts broken away showing the metal channel reinforcement for the sides of the seat-back;

Fig. 7 is a sectional view taken as indicated at 7—7 of Fig. 1 showing the rubber bead applied to the edges of the side and back panels;

Fig. 8 is a view with parts removed illustrating the adjustable blocks which may be positioned on the hooks; and, Fig. 9 is an enlarged view of the adjustable block shown in Fig. 8.

Referring to the drawings, a seat-back comprises three inter-connected panels, 6 being the back section, 7 being the side section, and 8 being an opened side section. The panels 6, 7, and 8 are preferably made of molded fiber glass which comprises glass fibers embedded and molded in a suitable resin such as for instance the polymerizable styrene resin. I have found that bonded fiber glass about $\frac{1}{16}$" thick may be molded so as to provide a seat back which will conform to the body of the user and which may be held in a generally conical shape by metal reinforcing channels secured along the lower edges of the sides of the foldable seat-back. The channels indicated as at 9 and 10 are curved so as to describe a circle in the plane of a boat or stadium seat 11. The channels are rivets as at 12 and 13 to transmit to the supporting surface 11 the loads imposed upon the side panels 7 and 8. The side panels 7 and 8 are hinged to the back 6 by a strip of canvas webbing 14 which is adhesively bonded to the fiber glass by a resin which is compatible with the resin which forms the fiber glass panels 6, 7, and 8. On that side of the panel opposite the canvas webbing 14, vertically extending ribs 15 and 16 are provided. The ribs may be integrally molded as at 15' and 16' of Fig. 5 or they may be operatively attached as at 15 and 16 of Fig. 4. It will be understood that the ribs 15 and 16 or 15' and 16' limit the opening swing movement of the hinge webbing 14. The ribs are arranged to abut each other when the side panels 7 and 8 are fully opened as shown in Fig. 1. The ribs 15—16 and 15'—16' serve not only to limit the opening movement of the hinge but to render the seat-back in its entirety rigid adjacent the hinged joint and prevent collapse of the seat when in use.

To secure the seat-back in position in a boat seat or stadium seat, such as 11, hooks 17 are riveted, spot welded, or otherwise suitably secured to the metal channels 10. Each of the hooks preferably include a spherical end portion 18 which serves as a pivot or fulcrum as the side panels 7 and 8 are tilted by the user.

In a modified form of my invention the blocks 22 may be mounted on the hooks 17 in the manner shown in Fig. 8. The blocks 22 are formed of rubber or other resilient material and are approximately cubical in shape and are formed with a central opening 23, the inner end of which is enlarged to receive the spherical end portion 18. The blocks 33 are thus retained on the ends of the hooks 17 by the tension in the blocks, but may be rotated about the horizontal axis of the terminal portion of the hook. The holes 23 are disposed eccentrically with respect to the radial surface of the block as more clearly shown in Fig. 9, so that the distance from the center aperture to each surface of the blocks is different from that of each other surface. Thus by rotating the blocks 22 about the bracket or hooks 17, the seat-back may be adapted to seats of varying thickness. If the block is square in cross section and the holes 23 is displaced three times as far from the center of the block toward one side, as 24, as it is toward the other side as 26, the distance from the holes to the sides are in arithmetical progression. Other proportions may be employed, however, the block may have other cross sections than the preferred square one. Ordinarily, the block 22 should engage the under surface of the thwart so as to grip the thwart between the blocks and the lower surface and the side portions 7 and 8 to maintain the seat-back in position.

Optional equipment includes a cushion 19 which may be attached as at 20 to the back panel 6, and the side when folded forms an envelope to enclose the cushion 19. Preferably, the upper edges of the side panels 7 and 8 and the back panel 6 have applied thereto a rubber bead or point 21 which is adhesively secured in place as shown in Fig. 7.

Although I have shown several modifications of my invention and described the same in considerable detail, it will be understood that the invention is not limited by such description but is defined by the scope of the following claims.

What is claimed is:

1. A foldable seat-back comprising a back panel formed as a surface of revolution of a cone and a pair of side panels formed as a surface of revolution of a cone flexibly secured to the back panel and depending hooks secured to the lower edge of the side panels.

2. A seat-back comprising three interconnected sections, all of said sections being formed as a surface of revolution of a cone said sections being made of a flexible material and two of said sections having a rigid reinforcement at their lower edges.

3. A portable seat comprising a back panel formed of flexible material shaped to provide a surface of conical revolution and a pair of forwardly extending sides, said sides molded in the form of a conical surface of revolution, the lower edges of said sides having a metal reinforcing channel secured thereto and depending hooks secured to said channels.

4. A seat-back adapted to be fitted to a seat, comprising a curved back, two curved sides hinged along an element of the curved back to the lateral edges of the back so that the sides may extend forwardly from and continue the curvature of the back or be folded so as to lie adjacent the back, the lower edges of the back and sides being formed to lie substantially in a plane when the sides are extended forwardly, the upper edges of the said curved sides sloping downwardly toward the free end thereof, and hooks on the sides at the forward end of the lower edge thereof adapted to reach around the forward edge of the seat and extend under the seat.

5. A seat-back adapted to be fitted to a seat, comprising a curved back panel, two side panels hinged along an element of the curved back to the lateral edges of the back panel so that the side panels may extend forwardly from the back panel or be folded so as to lie adjacent thereto, the lower edges of the panels being formed to lie substantially in a plane when the side panels are extended forwardly, the upper edges of the side panels sloping downwardly toward the free end thereof, and hooks on the side panels at the forward end of the lower edge thereof adapted to reach around the forward edge of the seat and extend under the seat.

6. A seat-back adapted to be fitted to a seat, comprising a back, two sides hinged to the lateral edges of the back so that the sides may extend forwardly from the back or be folded so as to lie adjacent the back, the lower edges of the back and sides being formed to lie substantially in a plane when the sides are extended forwardly, the upper edges of the said sides sloping downwardly toward the free end thereof, hooks on the sides at the forward end of the lower edge thereof adapted to reach around the forward edge of the seat and extend under the seat, and friction blocks on the hooks adapted to engage the underside of the seat.

7. A seat-back adapted to be fitted to a seat, comprising a back, two sides hinged to the lateral edges of the back so that the sides may extend forwardly from the back or be folded so as to lie adjacent the back, the lower edges of the back and sides being formed to lie substantially in a plane when the sides are extended forwardly, hooks on the sides at the forward end of the lower edge thereof adapted to reach around the forward edge of the seat and extend under the seat, and friction blocks on the hooks adapted to engage the underside of the seat, the friction blocks being eccentric with respect to the hooks and being rotatable thereon to vary the clearance between the friction blocks and the lower edges of the sides.

8. A seat-back adapted to be fitted to a seat, comprising a back portion and side portions, the lower edge of the seat back being formed to lie substantially in a plane, hooks at the forward ends of the lower edge thereof adapted to reach around the forward edge of the seat and extend under the seat, and friction blocks on the hooks adapted to engage the underside of the seat, the friction blocks being formed with faces at different distances from the hooks and being rotatable thereon to vary the clearance between the friction blocks and the lower edge of the seat-back.

9. A seat-back adapted to be fitted to a seat, comprising a curved back, two sides hinged along an element of the curved back to the lateral edges of the back so that the sides may extend forwardly from the back or be folded so as to lie adjacent the back, the lower edges of the back and sides being formed to lie substantially in a plane when the sides are extended forwardly, and means on the sides at the forward end of the lower edge thereof adapted to engage the forward edge and the under side of the seat.

10. A seat-back adapted to be fitted to a seat, comprising a curved back, two curved sides hinged along an element of the curved back to the lateral edges of the back so that the sides may extend forwardly from and continue the curvature of the back or be folded so as to lie adjacent the back, the lower edges of the back and sides being formed to lie substantially in a plane when the sides are extended forwardly, members on the sides at the forward end of the lower edge thereof adapted to reach around the forward edge of the seat, and means on the members adapted to engage frictionally the underside of the seat.

11. A seat-back adapted to be fitted to a seat, comprising a back, two sides hinged to the lateral edges of the back so that the sides may extend forwardly from the back or be folded so as to lie adjacent the back, the lower edges of the back and sides being formed to lie substantially in a plane when the sides are extended forwardly, and hooks on the sides at the forward end of the lower edge thereof adapted to reach around the forward edge of the seat and extend under the seat, the hooks being formed with enlarged ends, and blocks of resilient material fitted over the enlarged ends of the hooks adapted to frictionally engage the under side of the seat.

References Cited in the file of this patent

UNITED STATES PATENTS

| | | |
|---|---|---|
| 618,407 | Forbes | Jan. 31, 1899 |
| 846,904 | Brady et al. | Mar. 12, 1907 |
| 1,756,182 | Drane | Apr. 29, 1930 |
| 1,902,709 | King | Mar. 21, 1933 |
| 2,010,532 | Boesch | Aug. 6, 1935 |
| 2,383,041 | Campbell | Aug. 21, 1945 |

FOREIGN PATENTS

| | | |
|---|---|---|
| 129,832 | Switzerland | Jan. 2, 1929 |